United States Patent [19]
Davison

[11] 3,865,769

[45] Feb. 11, 1975

[54] AQUEOUS PAPER SIZE COMPOSITION CONTAINING HYDROCARBON RESIN AND FORTIFIED ROSIN

[76] Inventor: Robert W. Davison, 616 Northside Dr., North Hills, Del. 19809

[22] Filed: Feb. 15, 1973

[21] Appl. No.: 332,866

Related U.S. Application Data

[63] Continuation of Ser. No. 117,812, Feb. 22, 1971, abandoned, which is a continuation-in-part of Ser. No. 811,188, March 27, 1969, Pat. No. 3,565,755, which is a continuation-in-part of Ser. No. 522,361, Jan. 24, 1966, abandoned.

[52] U.S. Cl. ............... 260/27 R, 106/238, 162/168, 162/180, 260/105
[51] Int. Cl. ............................................. C09j 3/26
[58] Field of Search .......... 260/27 R, 105; 106/238; 162/168, 180

[56] References Cited
UNITED STATES PATENTS
3,193,449  7/1965  Aldrich ............................. 260/27 R
3,379,663  4/1968  Takei et al. .................... 260/23.7 A FOREIGN PATENTS OR APPLICATIONS
746,057  11/1966  Canada Primary Examiner—Melvyn I. Marquis
Assistant Examiner—William Parker
Attorney, Agent, or Firm—Charles L. Board

[57] ABSTRACT

Disclosed is a substantially stable aqueous suspension of a blend of fortified rosin and hydrocarbon resin in finely divided form. Some unfortified rosin can be included in the blend. The suspension, which is stable for prolonged periods of time, has particular utility as a paper size.

20 Claims, No Drawings

AQUEOUS PAPER SIZE COMPOSITION CONTAINING HYDROCARBON RESIN AND FORTIFIED ROSIN

This is a continuation of application Ser. No. 117,812, filed Feb. 22, 1971 and now abandoned.

Application Ser. No. 117,812, filed Feb. 22, 1971 is a continuation-in-part of application Ser. No. 811,188, filed Mar. 27, 1969, now U.S. Pat. No. 3,565,755, issued Feb. 23, 1971. Application Ser. No. 811,188, filed Mar. 27, 1969 is a continuation-in-part of application Ser. No. 522,361, filed Jan. 24, 1966, now abandoned.

This invention relates to novel aqueous suspensions which contain finely divided particles of a blend of fortified rosin and hydrocarbon resin and, optionally, in the blend, unfortified rosin, which suspensions are useful as paper size.

In accordance with this invention there are provided novel aqueous suspensions which have as their essential ingredients and which consist essentially of, by weight, about 95 percent to about 40 percent water and about 5 percent to about 60 percent solids. Preferred suspensions will consist of about 70 percent to about 55 percent water and from about 30 percent to about 45 percent solids, the total of the two being about 100 percent.

The solids content of the suspensions will be a blend which consists essentially of, by weight, from about 90 percent to about 35 percent of rosin-base material (to be detailed more fully hereinafter) hereinafter sometimes referred to as "component (A)" and from about 10 percent to about 65 percent of certain hydrocarbon resins (to be detailed more fully hereinafter) sometimes referred to hereinafter as "component (B)", the total of the two being about 100 percent. A relatively small proportion of the rosin-base material is saponified. The saponified rosin-base material functions primarily as a dispersing agent for the suspension and the suspension is essentially stable for prolonged periods of time. The suspensions of this invention are stable for periods of up to about 6 months and longer. The remainder of the solids content of the suspension (the unsaponified portion) is present in the form of finely divided particles, most of which have a particle size of about 0.5 micron and less. Particle agglomerates, if any exist, can be removed from the suspension, if desired, by known methods as by passing the suspension through a screen having a mesh appropriate to remove the particle agglomerates.

Preferably the particles of the suspensions will be a blend which consist essentially of, by weight, from about 75 percent to about 45 percent of component (A) and from about 25 percent to about 55 percent of component (B).

COMPONENT (A)

It is not required that unfortified rosin be present as a portion of component (A); however, fortified rosin will always be present at least as a portion of component (A). Thus, all suspensions of this invention will contain particles which are a blend of hydrocarbon resin and fortified rosin and the blend may, or may not, contain unfortified rosin.

The unfortified rosin portion of the blend, if present, can be any of the commercially available types of rosin such as wood rosin, gum rosin, and tall oil rosin, in their crude or refined state. Mixtures of two or more can be emloyed if desired. The unfortified rosin can be partially or substantially completely hydrogenated and can be treated, as by treatment with formaldehyde, to inhibit crystallization thereof.

Fortified rosin is known in the art and is the Diels-Alder adduct reaction product of rosin and an acidic compound containing the

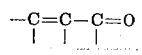

group derived by heating rosin and the acidic compound at temperatures of from about 150° C. to about 210° C. Fortified rosin is sometimes referred to as "rosin adduct."

Examples of acidic compounds containing the

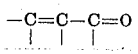

group that can be used to prepare fortified rosin include the unsaturated organic acids and their known anhydrides, specific examples of which are acrylic acid, fumaric acid, maleic acid, maleic anhydride, itaconic acid, itaconic anhydride, citraconic acid and citraconic anhydride. An acidic compound containing the

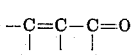

group is hereinafter referred to as "acidic compound."

The rosin used to prepare the fortified rosin can be any of the rosins enumerated above. Also, as the fortified rosin, a fortified rosin that has been substantially completely hydrogenated after Diels-Alder adduct formation can be employed.

For the purposes of this invention the amount of acidic compound present in the solids is critical and will be from about 2 percent to about 12 percent, and preferably from about 4 percent to about 8 percent, based on the total solids weight of the suspension. Substantially all the acidic compound is in the adducted form with rosin, that is, there is little, if any, free or uncombined adducting acidic compound present. Fortified rosin having a higher content of adducted acid compound than the upper limit set forth above can be used, it being necessary only to incorporate in the blend some unfortified rosin so that the resulting composition when blended with the hydrocarbon resin will provide a solids content having the desired amount acidic compound, essentially all of which is in the rosin adduct form.

The amount of saponified fortified rosin or unfortified rosin or both present in the suspension will be equivalent to $1.5 \times 10^{-2}$ to 0.9 milliequivalents of saponified carboxyl per gram of total solids of the suspension.

COMPONENT (B)

Hydrocarbon resins emloyed in this invention are noncrystalline thermoplastic synthetic polymers having a ring and ball softening point of from about 45° C. to about 150° C., preferably from about 50° to 90° C.; a molecular weight within the range of from about 350 to about 2,000, preferably from about 400 to 900; and an acid number of less than about 1. These hydrocarbon resins can be prepared by methods known in the art by homopolymerizing and copolymerizing ethylenically unsaturated hydrocarbon monomers containing only hydrogen and carbon in their molecular structure.

Hydrocarbon resins meeting the above requirements can be derived from liquid petroleum distillates boiling in the range of from about 20° C. to about 280° C., and preferably in the range of about 30° C. to about 140° C., or any fraction boiling within these ranges.

Terpene resins having the above properties can also be employed in carrying out this invention.

In place of cracked petroleum distillates, unsaturated hydrocarbon compounds from other sources, alone or in admixture, can be used. Thus, synthetically derived ethylenically unsaturated hydrocarbons, alone or in admixture with other synthetically derived or naturally occurring ethylenically unsaturated hydrocarbons, can be polymerized to produce hydrocarbon resins for use in this invention. All that is required is that the polymer have properties as above set out. Thus, relatively pure hydrocarbon compounds such as diolefins and olefins can be homopolymerized or can be polymerized in admixture with varying amounts of cyclic diolefins or cyclic olefins, or both, or of substituted benzene hydrocarbons such as styrene, alpha-methyl styrene, vinyl toluene or divinyl benzene to produce resins having the above properties. Various proportions of these unsaturated hydrocarbons of any or all of the classes mentioned above can be mixed with certain fractions of cracked distillates to provide satisfactory materials for resin formation.

Hydrocarbon resins can be prepared by causing the hydrocarbons to react in the presence of a suitable catalyst or activating agent or by the use of heat alone. The catalysts which can be used include acidic catalysts such as $AlCl_3$, $ZnCl_2$, $BF_3$, $H_2SO_4$, $H_3PO_4$ and acid clays, anionic catalysts such as metallic lithium and sodium or their alkyl derivatives, metal coordinate catalysts such as aluminum triisobutyl and $TiCl_4$ or $TiCl_3$, and free radical catalysts such as benzoyl peroxide, cumene hydroperoxide, tert-butyl hydroperoxide, and hydrogen peroxide. Temperatures utilized will vary depending on the monomers and catalysts used and are well known to the art.

After the reaction is essentially complete, any residual catalyst can be removed if required. Unreacted hydrocarbons and low molecular weight materials can be removed by vacuum or steam distillation, if desired.

The following resins are illustrative of hydrocarbon resins that can be used in this invention.

RESIN A

A suitable hydrocarbon resin that can be used in this invention is a petroleum resin available commercially under the proprietary designation Piccopale 70. This resin has a ring and ball softening point of about 70° C., a molecular weight of about 800, and an acid number of less than 1.

RESIN B

Another suitable petroleum hydrocarbon resin is that available commercially as Piccopale 100. This resin has a ring and ball softening point of about 100° C., a molecular weight of about 1,400, and an acid number of less than 1.

RESIN C

Another hydrocarbon resin that can be used in this invention is a vinyl toluene copolymer available commercially under the proprietary name Piccotex 120 which has a molecular weight of from about 1,400 and a ring and ball softening point of about 120° C. The acid number of this resin is less than 1.

RESIN D

Another resin that can be used in this invention is a vinyl toluene copolymer that has been hydrogenated to an alpha value at 262 millimicrons of less than .05. This resin has a ring and ball softening point of about 135° C. and a molecular weight of about 1,400. The acid number of this resin is less than about 1.

Terpene resins are hydrocarbon resins and, as above set forth, those having the properties above set forth can be used in this invention. *Encyclopedia of Chemical Technology*, Vol. 14, The Interscience Encyclopedia, Inc., New York, 1955, reports that Southern sulfate turpentines are comprised of, by weight, 60 percent to 65 percent alpha-pinene and 25 percent to 35 percent beta-pinene. Refined Southern sulfate turpentine (200 parts) is added dropwise to an agitated mixture of 450 parts dry toluene and 18 parts aluminum chloride. The temperature during addition is held at 4° to 10° C. by cooling. The time of addition is 55 minutes. Reaction is continued at 8°–10° C. for 4 hours after turnpentine addition is complete. Water (22° C.) is added with agitation while keeping the temperature below 20° C. 15 minutes after water addition is complete, 45 parts calcium hydroxide is added and the mixture is warmed and held at 70° C. for 20 minutes. The hot mixture is filtered and the filter cake is washed with toluene, and the washings are combined with the product filtrate. When the filtrate cools, additional solids form which are separated by an additional filtration. The resulting filtrate is stripped using a heated oil bath for heat. Stripping is stopped at 120 mm. pressure with the oil bath at 200° C. The residue is soft terpene hydrocarbon resin consisting of polymerization products of terpene hydrocarbons and has a molecular weight of about 500 and a ring and ball softening point of about 75° C. This resin is hereinafter referred to as "Resin E." Vacuum topping of this resin provides a residue having a molecular weight of about 840 and a ring and ball softening point of about 115° C. This resin is hereafter referred to as "Resin F."

In preparing the aqueous suspensions of this invention there is first prepared an essentially unstable oil-in-water emulsion by mixing together an aqueous medium containing water and dissolved therein a material such as saponified rosin, saponified fortified rosin, an alkaline material capable of forming a soap with rosin and fortified rosin when in admixture, and mixtures of any of the above; and a solution of rosin-base material and hydrocarbon resin dissolved in a water-immiscible organic solvent such, for example as benzene. It is well within the skill of those versed in the art to adjust the proportions of the above ingredients in order to obtain a suspension containing the desired proportions of water and solids in the final product.

A stable oil-in-water emulsion is prepared by homogenization of the unstable oil-in-water emulsion. The saponified rosin or saponified fortified rosin or both, whether present originally in the aqueous medium or formed in situ by reaction of an alkaline material and rosin or fortified rosin, functions as the sole emulsifying agent for the emulsion.

Once the essentially stable oil-in-water emulsion is prepared, substantially all of the water-immiscible organic solvent in which the hydrocarbon resin and rosin-base material were dissolved is removed, such as by distillation. Upon substantially complete removal of all the water-immiscible organic solvent, there is provided an essentially stable aqueous dispersion of finely divided particles of a blend of hydrocarbon resin and rosin-base material.

In preparing the stable suspensions of this invention, it is preferred to use as the aqueous medium which is subsequently admixed with the water-immiscible organic solvent solution of hydrocarbon resin and rosin-base material an aqueous solution of an alkaline material. Suitable alkaline materials include the usual organic and inorganic base materials employed to form a soap of rosin or a soap of fortified rosin. Specific examples of such alkaline materials include lithium hydroxide, sodium hydroxide, potassium hydroxide, lithium carbonate, sodium carbonate, potassium carbonate, ammonia, and water-soluble amines such, for example, as morpholine, ethylamine, n-propylamine, and n-butylamine. Preferred solutions are those prepared by dissolving either potassium hydroxide or sodium hydroxide in water in the desired amount. It is to be understood that aqueous solutions containing more than one of the above enumerated alkaline materials can be employed if desired.

As will be obvious to those skilled in the art, the rosin soap or the fortified rosin soap can be prepared by means known in the art and dissolved in water to provide the aqueous solution for use in carrying out this invention. Thus, instead of preparing the rosin soap and/or fortified rosin soap in situ, which is the preferred method, the soap can be prepared separately and in advance.

The solution which forms the dispersed phase of the oil-in-water emulsion is prepared by dissolving the desired amount of hydrocarbon resin and the desired amount of rosin-base material in a water-immiscible organic solvent, which solvent is a solvent for both the hydrocarbon resin and the rosin-base material. While there are a number of solvents that meet the above requirements and that can be used in the process described herein, the preferred solvent is benzene. Examples of other solvents that can be employed include propylene dichloride, toluene and carbon tetrachloride. Mixtures of two or more solvents, while not recommended, can be employed if desired.

As above set forth, the organic solvent solution of hydrocarbon resin and rosin-base material is comprised of a solvent. Since the solvent is removed during the process of preparing the aqueous suspension of this invention, the amount employed to produce the solution should, for economic reasons, be kept to a minimum. It will be apparent to those skilled in the art that the amount of solvent employed can be varied over a relatively wide range, the minimum amount being that required to dissolve component (A) and component (B), preferably under room temperature conditions, and the maximum amount being governed primarily by economic considerations. The amount of component (A) and component (B) will usually be that desired in the final aqueous suspension. The solids content of an aqueous suspension can be increased, if desired, by removing some of the water, as by distillation. In preparing the organic solvent solution for use in this invention, it is recommended that the solution be comprised of about 25 parts to about 100 parts by weight of total solids for each 100 parts by weight of solvent.

The amount of alkaline material employed in preparing the aqueous medium can be varied and will depend on the specific alkaline material employed and is within the skill of those versed in the art.

In preparing the aqueous emulsions prior to solvent removal, the amounts of organic solvent solution and aqueous medium employed will depend on the composition of each and will depend usually on the desired composition of the end product aqueous suspension. As above set forth, after solvent removal, some of the water can be removed to provide an aqueous suspension of higher solids content. The determination of the amounts of aqueous medium and organic solvent solution is within the skill of one versed in the art having before him the teachings of this invention. Thus, for example, having determined the composition of organic solvent solution, the amount of aqueous medium admixed therewith will have sufficient alkaline material present to provide the desired amount of saponified carboxyl in the end product. In general the ratio of weight of aqueous medium to organic solvent solution can be varied successfully from 1:1 to 3:1. The amount of aqueous medium used must be adequate to prevent inversion of the primary emulsion. Economics considerations will limit excess use of water, as excess water produces a suspension of relatively low solids content for shipment, storage and the like. Shipment and/or storage of water, particularly when unnecessary, is undesirable and expensive.

EXAMPLE 1

This example illustrates the preparation of fumaric acid fortified rosin. Fumaric acid, 16 parts, is adducted, at a temperature of about 205° C. with tall oil rosin, 84 parts. The fumaric acid dissolves in the fused tall oil rosin and reacts therewith to provide fumaric acid fortified tall oil rosin. After substantially all the fumaric acid has reacted with the tall oil rosin, the fortified rosin is cooled to room temperature (about 23° C.). The fortified rosin contains 16 percent fumaric acid, substantially all of which is in the combined or adducted form.

The following examples are illustrative of this invention. All parts and percentages are by weight unless otherwise specified.

EXAMPLE 2

A solution is prepared by dissolving 46.9 parts of unfortified formaldehyde treated tall oil rosin, 37.5 parts of the fortified rosin of Example 1, and 15.6 parts of Resin A in 100 parts of benzene. The resulting solution is thoroughly admixed with a preheated (about 40° C.) aqueous solution prepared by dissolving 0.43 part of sodium hydroxide in 200 parts of water to provide an oil-in-water emulsion. The sodium hydroxide reacts with some of the carboxyls of the unfortified rosin and/or the fortified rosin to provide a rosin-base soap. This emulsion, which is essentially unstable, is passed twice through an homogenizer at homogenization pressures of from about 3,500 to 4,000 p.s.i. The resulting product is an oil-in-water emulsion having excellent stability and in which the rosin-base soap functions as emulsifying agent for the system. Subsequently, substantially all benzene is removed from the emulsion by distillation whereby there is provided an aqueous suspension of good stability. The solids content of the suspension is about 35 percent, about 15.6 percent of which is Resin A. About 6 percent of the solids content is adducted fumaric acid. The rosin base soap present in the system functions as the stabilizer for the suspension and the amount present therein is equivalent to about .108 milliequivalents of carboxyl per gram of total solids.

EXAMPLE 3

Example 2 is repeated except that 31.2 parts Resin A and 31.3 parts of unfortified rosin are used. The suspension has good stability and has a solids content of about 35 percent, about 6 percent of the solids content is adducted fumaric acid, and about 31.2 percent of the solids content is Resin A.

EXAMPLE 4

Example 2 is repeated except that 62.5 parts Resin A is employed. No unfortified resin is used in this example. The suspension has good stability and has a solids content of about 35 percent, about 6 percent of the solids content is adducted fumaric acid, and about 62.5 percent of the solids content is Resin A.

To determine the sizing efficiency of each of the aqueous suspension of Examples 2, 3, and 4, handsheets are prepared using the suspensions as the sole sizing agent. To prepare the handsheets, Rayonier bleached kraft pulp is suspended in standard hard water and beaten to 750 ml. S-R freeness in a Noble and Wood cycle beater. Size additions are made to 2-liter portions of the beaten slurry which has been diluted to 2.5 percent solids by weight. Sufficient alum is added to each sized slurry to provide a pH of about 4.5. The slurry is then diluted to a consistency of 0.27 percent in the proportioner, using acid-alum dilution water.

The dilution water is prepared by reducing the pH of water of moderate hardness to 5.0 with sulfuric acid, then adding enough alum to provide 5 p.p.m. soluble aluminum. 1-liter portions of porportioner pulp slurry are diluted further with acid-alum dilution water to a deckle box ocnsistency of 0.025 percent in order to form 40-pound basis weight (24 inches × 36 inches — 500 sheet ream) handsheet using a Noble and Wood sheetmaking apparatus. A closed white water system is employed. Formed sheets are wet-pressed to 33 percent solids content and then dried at 240° F. on a steam drum drier. All handsheets are conditioned for at least 2 days at 72° F. and 50 percent relative humidity and are tested in this environment for size properties by using Hercules Sizing Test.

Table I below sets forth the sizing results for the sizes of the examples at size concentration of 0.5 percent. Size concentration is by weight and is based on the weight of the dry pulp. Thus, 0.5 percent size concentration indicates that 0.5 percent by weight of the solids content of the aqueous suspension of the specified example, based on the weight of the dry pulp, is added.

TABLE I

| Size of Example | Hercules Sizing Test Results in Seconds pH 4.5 |
| --- | --- |
| 2 | 133 |
| 3 | 132 |
| 4 | 93 |

EXAMPLE 5

A solution is prepared by dissolving 46.9 parts of formaldehyde treated tall oil rosin, 37.5 parts of the fortified rosin of Example 1, and 15.6 parts of Resin B in 100 parts of benzene. The resulting solution is thoroughly admixed with a preheated (about 40° C.) aqueous solution prepared by dissolving 0.43 part of sodium hydroxide in 200 parts of water to provide an oil-in-water emulsion. The sodium hydroxide reacts with some of the carboxyls of the unfortified rosin and/or the fortified rosin to provide a rosin base soap. This emulsion, which is essentially unstable, is passed twice through an homogenizer (preheated to about 40° C.) at homogenization pressures of from about 3,500 to 4,000 p.s.i. The resulting product is an oil-in-water emulsion having excellent stability and in which the rosin and/or fumaric acid fortified rosin soap functions as an emulsifying agent for the system. Subsequently, substantially all benzene is removed from the emulsion by distillation, whereby there is provided an aqueous suspension of good stability. The solids content of the suspension is about 35 percent, about 15.6 percent of which is Resin B. About 6 percent of the solids content is adducted fumaric acid. The rosin base soap present in the system functions as the stabilizer for the suspension and the amount present therein is equivalent to about .108 milliequivalents of carboxyl per gram of total solids.

EXAMPLE 6

Example 5 is repeated using 31.2 parts of Resin B and 31.3 parts of unfortified rosin. The suspension has good stability and a solids content of about 35 percent; about 31.2 percent thereof being Resin B and about 6 percent thereof being adducted fumaric acid.

EXAMPLE 7

Example 5 is repeated using 46.9 parts of Resin B and 25.6 parts of unfortified rosin. The suspension has good stability and a solids content of about 35 percent; about 46.9 percent thereof being Resin B and about 6 percent thereof being adducted fumaric acid.

EXAMPLE 8

Example 5 is repeated using 62.5 parts of Resin B and no unfortified rosin. The suspension has good stability and a solids content of about 35 percent; about 62.5 percent thereof being Resin B and about 6 percent thereof being adducted fumaric acid.

The sizing efficiency of each suspension of Examples 5, 6, 7 and 8 is determined in the same manner as for Examples 2, 3 and 4 suspensions. Results are set out in Table II below.

TABLE II

| Size of Example | Hercules Sizing Test Results in Seconds pH 4.5 |
| --- | --- |
| 5 | 129 |
| 6 | 133 |
| 7 | 115 |
| 8 | 76 |

EXAMPLE 9

A solution is prepared by dissolvling 46.9 parts of formaldehyde treated tall oil rosin, 37.5 parts of the fortified rosin of Example 1, and 15.6 parts of Resin E in 100 parts of benzene. The resulting solution is thoroughly admixed with a preheated (about 40° C.) aqueous solution prepared by dissolving 0.43 part of sodium hydroxide in 200 parts of water to provide an oil-in-water emulsion. The sodium hydroxide reacts with some of the carboxyls of the rosin and/or the fortified rosin to provide a rosin base soap. This emulsion, which is essentially unstable, is passed twice through a commercial homogenizer (preheated to about 40° C.) at homogenization pressures of from about 3,500 to 4,000 p.s.i. The resulting product is an oil-in-water emulsion having excellent stability and in which the rosin and/or fumaric acid fortified rosin soap functions as an emulsifying agent for the system. Subsequently, substantially all benzene is removed from the emulsion by distillation whereby there is provided an aqueous suspension of good stability. The solids content of the suspension is about 35 percent, about 15.6 percent of which is Resin E. About 6 percent of the soids content is adducted fumaric acid. The rosin base soap present is the same as in Example 2.

EXAMPLE 10

Example 9 is repeated using 31.2 parts of Resin E and 31.3 parts unfortified rosin. The suspension has good stability and a solids content of about 35 percent; about 31.2 percent thereof being Resin E and about 6 percent thereof being adducted fumaric acid.

EXAMPLE 11

Example 9 is repeated using 46.9 parts of Resin E and 25.6 parts of unfortified rosin. The suspension has good stability and a solids content of about 35 percent; about 46.9 percent thereof being Resin E and about 6 percent thereof being adducted fumaric acid.

EXAMPLE 12

Example 9 is repeated using 62.5 parts of Resin E and no unfortified rosin. The suspension has good stability and a solids content of about 35 percent; about 62.5 percent thereof being Resin E and about 6 percent thereof being adducted fumaric acid.

The sizing efficiency of the suspensions of Examples 9, 10, 11, and 12 are determined in the same manner as for Examples 2, 3 and 4. Results are set out in Table III below.

TABLE III

| Size of Example | Hercules Sizing Test Results in Seconds pH 4.5 |
|---|---|
| 9 | 148 |
| 10 | 156 |
| 11 | 159 |
| 12 | 127 |

EXAMPLE 13

A solution is prepared by dissolving 46.9 parts of formaldehyde treated tall oil rosin, 37.5 parts of the fortified rosin of Example 1, and 15.6 parts of Resin C in 100 parts of benzene. The resulting solution is thoroughly admixed with a preheated (about 40°C.) aqueous solution prepared by dissolving 0.43 part of sodium hydroxide in 200 parts of water to provide an oil-in-water emulsion. The sodium hydroxide reacts with some of the carboxyls of the rosin and/or the fortified rosin to produce a rosin base soap. This emulsion, which is essentially unstable, is passed twice through a commercial homogenizer (preheated to about 40° C.) at homogenization pressures of from about 3,500 to 4,000 p.s.i. The resulting product is an oil-in-water emulsion having excellent stability and in which the rosin and/or fumaric acid fortified rosin soap functions as an emulsifying agent for the system. Subsequently, substantially all benzene is removed from the emulsion by distillation whereby there is provided an aqueous suspension of good stability. The solids content of the suspension is about 35 percent, about 15.6 percent of which is Resin C. About 6 percent of the solids content is adducted fumaric acid. The rosin base soap present in the system functions as stabilizer for the suspension and the amount present therein is the same as Example 2.

EXAMPLE 14

Example 13 is repeated using 31.2 parts of Resin C and 31.3 parts of unfortified rosin. The suspension has good stability and a solids content of about 35 percent; about 31.2 percent thereof being Resin C and about 6 percent thereof being adducted fumaric acid.

EXAMPLE 15

Example 13 is repeated using 49.6 parts of Resin C and 25.6 parts of unfortified rosin. The suspension has good stability and a solids content of about 35 percent; about 49.6 percent thereof being Resin C and about 6 percent thereof being adducted fumaric acid.

EXAMPLE 16

Example 13 is repeated using 62.5 parts of Resin C and no unfortified rosin. The suspension has good stability and a solids content of about 35 percent about 62.5 percent thereof being Resin C and about 6 percent thereof being adducted fumaric acid.

The sizing efficiency of the suspensions of Examples 13, 14, 15 and 16 are determined in the same manner as for Examples 2, 3 and 4. Results are set forth in Table IV below.

TABLE IV

| Size of Example | Hercules Sizing Test Results in Seconds pH 4.5 |
|---|---|
| 13 | 156 |
| 14 | 137 |
| 15 | 123 |
| 16 | 33 |

EXAMPLE 17

A solution is prepared by dissolving 46.9 parts of formaldehyde treated tall oil rosin, 37.5 parts of the fortified rosin of Example 1, and 15.6 parts of Resin D in 100 parts of benzene. The resulting solution is thoroughly admixed with a preheated (about 40°C.) aqueous solution prepared by dissolving 0.43 part of sodium hydroxide in 200 parts of water to provide an oil-in-water emulsion. The sodium hydroxide reacts with some of the carboxyls of the rosin and/or the fortified rosin to provide a rosin base soap. This emulsion, which is essentially unstable, is passed twice through a commercial homogenizer (preheated to about 40° C.) at homogenization pressures of from about 3,500 to 4,000 p.s.i. The resulting product is an oil-in-water emulsion having excellent stability and in which the rosin and/or fumaric acid fortified rosin soap functions as an emulsifying agent for the system. Subsequently, substantially all benzene is removed from the emulsion by distillation whereby there is provided an aqueous suspension of excellent stability. The solids content of the suspension is about 35 percent, about 15.6 percent of which is Resin D. About 6 percent of the solids content is adducted fumaric acid. The rosin base soap present in the system functions as stabilizer for the suspension and the amount present therein is the same as in Example 2.

EXAMPLE 18

Example 17 is repeated using 31.2 parts Resin D and 31.3 parts unfortified rosin. The suspension has good stability and a solids content of about 35 percent; about 31.2 percent of which is Resin D and about 6 percent of which is adducted fumaric acid.

EXAMPLE 19

Example 17 is repeated using 46.9 parts Resin D and 25.6 parts of unfortified rosin. The suspension has good stability and a solids content of about 35 percent; about 46.9 percent of which is Resin D and about 6 percent of which is adducted fumaric acid.

EXAMPLE 20

Example 17 is repeated using 62.5 parts Resin D and no unfortified rosin. The suspension has good stability and a solids content of about 35 percent; about 62.5 percent of which is Resin D and about 6 percent of which is adducted fumaric acid.

The sizing efficiency of the suspensions of Examples 17, 18, 19, and 20 is determined as for the suspensions of Examples 2, 3 and 4. The results thereof are set forth in Table V below.

TABLE V

| Size of Example | Hercules Sizing Test Results in Seconds pH 4.5 |
| --- | --- |
| 17 | 127 |
| 18 | 130 |
| 19 | 115 |
| 20 | 54 |

EXAMPLE 21

Wood rosin, about 1,460 parts, is heated to its fusion temperature to provide a molten mass. To this molten mass is added 278 parts of fumaric acid. The fumaric acid is added slowly with constant stirring. The fumaric acid fortified rosin thus produced is cooled to room temperature. The amount of adducted fumaric acid is 16 percent by weight based on the total weight of fortified rosin. The fortified rosin has an acid number of 277 and essentially no unadducted or free uncombined fumaric acid.

EXAMPLE 22

A solution is prepared by dissolving 127 parts of wood rosin (acid number 167), 90 parts of the fortified rosin of Example 21 and 23 parts of Resin E in 240 parts of benzene. The solution is admixed with a solution prepared by dissolving 1.96 parts of potassium hydroxide in 478 parts of water, and the resulting mixture is subsequently homogenized to provide a stable emulsion. The benzene is then removed from the emulsion by distillation at atmospheric pressure. An aqueous suspension is obtained which has a 38.9 percent solids content, of which about 9.6 percent is Resin E. The fumaric acid content, substantially all of which is in the adduct form, is 6 percent of the solids weight. The rosin base soap present in the system is equivalent to about .146 milliequivalents of carboxyl per gram of solids.

EXAMPLE 23

Example 22 is repeated using Resin F instead of Resin E. The aqueous suspension has a 39.5 percent solids content. The amount of adducted fumaric acid is about 6 percent of the solids weight. The amount of saponified rosin-base material is the same as Example 22. Of the solids content, about 9.6 percent is Resin F.

The suspensions of Examples 22 and 23 are used to size paper in the same manner as that used employing the suspensions of Examples 2, 3 and 4. Resistance to penetration by Standard Feather Ink is determined by use of the Hercules photometer (D. Price, R. H. Osborn, and J. W. Davis, TAPPI 36, 42, 1953). The time necessary for ink penetration to reduce light reflectance to 85 percent of the sheet's initial value is used to represent the degree of sizing. Table VI below sets forth sizing results.

TABLE VI

| Size of Example | Photometer Sizing (Seconds) pH 4.5 |
| --- | --- |
| 22 | 141 |
| 23 | 149 |

While, as above set forth, the amount of saponified fortified rosin or saponified unfortified rosin, or both, present in the suspension can be equivalent to about .015 to 0.9 milliequivalents of saponified carboxyl per gram of total solids of the suspension, the preferred amount is from about .05 to about 0.5 milliequivalents.

In the working examples the amount of hydrocarbon resin contained in the solids content of the suspension is set forth. It is understood that this resin is in the form of a blend with the fortified rosin and with the unfortified rosin when unfortified rosin is included in the preparation. Thus, each individual particle of the aqueous suspension is a blend of hydrocarbon resin and rosin-base material derived by solvent blending.

The aqueous suspensions of this invention have particular utility as sizing compositions for use in the manufacture of sized paper. As shown by the sizing test results above, the aqueous suspensions are highly satisfactory for this purpose.

The above description and working examples are illustrative of this invention and not in limitation thereof.

What I claim and desire to protect by Letters Patent is:

1. An essentially stable aqueous suspension of finely divided particles adapted for use as a paper size composition, the particles of the suspension being a blend consisting essentially of (A) from about 10 percent to about 65 percent of a noncrystalline thermoplastic synthetic nonadducted hydrocarbon resin having a ring and ball softening point of from about 45° C. to about 150° C., a molecular weight of from about 350 to about 2,000, and an acid number of less than about 1, and (B) from about 90 percent to about 35 percent of rosin-base material selected from the group consisting of fortified rosin and unfortified rosin-fortified rosin mixture, the fortified rosin being adduct reaction product of rosin and an acidic compound containing the

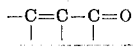

group, said suspension containing a relatively small amount of saponified rosin-base material which functions as dispersing agent for the dispersion, the amount thereof being equivalent to about .015 to about 0.5 milliequivalents of saponified carboxyl per gram of total solids of the suspension, the total solids of the aqueous suspension consisting essentially of the saponified rosin-base material and the finely divided particles, the total solids being from about 5 percent to 60 percent, by weight of the aqueous suspension, and the amount of adducted acidic compound being from about 2 percent to about 12 percent of the total solids weight.

2. The suspension of claim 1 wherein (A) is present in the amount of from about 25 percent to about 55 percent and (B) is present in the amount of from about 75 percent to about 45 percent.

3. The suspension of claim 2 wherein (A) is a nonadductd hydrocarbon resin having a ring and ball softening point of from about 50°C. to about 90°C., a molecular weight of from about 400 to about 900, and an acid number of less than about 1.

4. The suspension of claim 3 wherein the total solids is from about 30 percent to about 45 percent and the amount of adducted acidic compound is from about 4 percent to about 8 percent.

5. The suspension of claim 4 wherein the adducted acidic compound is fumaric acid.

6. The suspension of claim 1 wherein the amount of saponified rosin-base material is equivalent to about .05 to 0.5 milliequivalents of saponified carboxyl per gram of total solids of the suspension.

7. An essentially stable aqueous suspension of finely divided particles adapted for use as a paper size composition, the particles of the suspension being a blend consisting essentially of (A) from about 25 percent to about 55 percent of a noncrystalline thermoplastic synthetic nonadducted hydrocarbon resin having a ring and ball softening point of from about 50°C. to about 90°C., a molecular weight of from about 400 to about 900, and an acid number of less than about 1, and (B) from about 75 percent to about 45 percent of rosin-base material selected from the group consisting of fortified rosin and unfortified rosin--fortified rosin mixture, the fortified rosin being the adduct reaction product of rosin and an acidic compound containing the

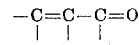

group, said suspension containing a relatively small amount of saponified rosin-base material which functions as dispersing agent for the dispersion, the amount thereof being equivalent to about .05 to 0.5 milliequivalents of saponified carboxyl per gram of total solids of the suspension, the total solids of the aqueous suspension consisting essentially of the saponified rosin-base material and the finely divided particles, the total solids being from about 30 percent to about 45 percent by weight of the aqueous suspension, and the amount of adducted acidic compound being from about 4 percent to about 8 percent of the total solids weight.

8. The suspension of claim 7 wherein the acidic compound is selected from the group consisting of fumaric acid, maleic acid, and maleic anhydride.

9. The suspension of claim 8 wherein the saponified rosin-base material is the sodium soap.

10. The suspension of claim 9 wherein the acidic compound is fumaric acid.

11. Paper sized with the solids of the aqueous suspension of claim 1.

12. Paper sized with the solids of the aqueous suspension of claim 2.

13. Paper sized with the solids of the aqueous suspension of claim 3.

14. Paper sized with the solids of the aqueous suspension of claim 4.

15. Paper sized with the solids of the aqueous suspension of claim 5.

16. Paper sized with the solids of the aqueous suspension of claim 6.

17. Paper sized with the solids of the aqueous suspension of claim 7.

18. Paper sized with the solids of the aqueous suspension of claim 8.

19. Paper sized with the solids of the aqueous suspension of claim 9.

20. Paper sized with the solids of the aqueous suspension of claim 10.

* * * * *